3,448,178
HOT MELT ADHESIVES COMPRISING ETHYLENE/
VINYL ACETATE COPOLYMERS AND ALPHA-
PINENE/PHENOL CONDENSATION PRODUCTS
Thomas P. Flanagan, Greenbrook, N.J., assignor to National Starch and Chemical Corporation, New York, N.Y., a corporation of Delaware
No Drawing. Continuation-in-part of application Ser. No. 421,099, Dec. 24, 1964. This application Sept. 22, 1967, Ser. No. 669,729
Int. Cl. C08f 29/42, 43/00; C08g 37/00
U.S. Cl. 260—897
2 Claims

ABSTRACT OF THE DISCLOSURE

Hot-melt adhesive compositions comprising a mixture of specified proportions of: (1) an ethylene/vinyl acetate copolymer and (2) a non-thermosetting, phenolic modified terpene resin consisting of the product resulting from the acid catalyzed condensation between essentially equimolar proportions of alpha-pinene and phenol. The latter hot-melt adhesive compositions are applicable for the bonding, to one another, of a wide variety of similar and dissimilar substrates.

---

This application is a continuation-in-part of my co-pending application Ser. No. 421,099, filed Dec. 24, 1964, now abandoned, as a continuation-in-part of my earlier application, Ser. No. 95,035, filed Mar. 31, 1961, now abandoned.

This invention relates to hot-melt adhesive compositions. More specifically, it relates to new hot-melt adhesive compositions comprising copolymers of ethylene and vinyl acetate admixed with certain other resinous materials, in combinations possessing superior and unexpected properties.

The term "resinous materials," as contemplated and used herein, refers to non-thermosetting phenolic resins, i.e. phenolic resins which will not solidify or set on heating. More specifically, the preferred resinous materials for use in the process of this invention comprise non-thermosetting, phenolic-modified terpene resins which are prepared by the condensation, in an acidic medium, of a bicyclic terpene and a phenol, and more specifically one resulting from the acid catalyzed condensation between essentially equimolar proportions of alpha-pinene and phenol.

It is a prime object of my invention to provide new hot-melt compositions based on ethylene/vinyl acetate copolymers having excellent adhesive properties, permitting them to be used in a great number of applications for the direct sealing of a wide variety of solid substrates which may be similar or dissimilar to one another.

It is my further object to achieve these desirable adhesive properties by reducing the cohesiveness of the ethylene/vinyl acetate copolymers with the specified "resinous materials."

It is my still further object to reduce the melt-viscosity or cohesive properties of these modified, rubbery, amorphous copolymers to a workable viscosity without appreciably reducing their adhesive properties, thereby permitting their application in equipment conventional to the hot-melt adhesives industry.

Ho-melt adhesives are bonding agents which achieve a solid state and resultant strength by cooling, as contrasted with other adhesives, such as pressure sensitive types, which achieve the solid state through evaporation or removal of solvents. Prior to heating, a hot-melt is a thermoplastic material which is in the form of a 100%, by weight, solid. Application of heat melts the solid hot-melt and brings it to the liquid state and, after removal of the heat, it sets by simple cooling. The latter behaviour is in direct contrast to thermosetting adhesives which set or harden by the application of heat and which remain hard upon continued application of heat.

Hot melt adhesives are also distinguished from pressure sensitive adhesives by the fact that when they are in the solid state, either as solid masses or as thin films, their surfaces are hard and devoid of substantial tackiness. In contrast, pressure sensitive adhesives are characterized by their soft, tacky films which are, of course, desirable in such products so that their coated substrates may be readily applied to a wide variety of substrates by the application of nothing more than manual pressure.

Combinations of polymers and copolymers containing polyethylene, synthetic resins, rubbers and the like have been proposed in the past for various kinds of hot melt adhesive compositions.

The prior known compositions contain a number of constituents in an attempt to assist the properties of the hot-melt adhesive composition such as its melting with heat, its viscosity in the molten state, its adhesiveness, flexibility, stability and other properties which are of importance for a great number of hot-melt adhesive uses. Many of these hot-melt adhesive compositions are often limited in their function as hot-melt adhesives because they are only mediocre with respect to one or more of the essential properties of hot-melt adhesive compositions. Frequently, it has been necessary to compromise these properties in order to get a composition having a very narrow range of useful working properties.

The use of compositions containing from 1 to 80% by weight of an ethylene/vinyl acetate copolymer for reinforcing wax coatings is disclosed in Belgian Patent No. 586,895. These ethylene/vinyl acetate copolymers may be prepared by copolymerizing a mixture of ethylene and vinyl acetate in the presence of a catalyst such as oxygen, or an organic peroxide such as t-butyl hydroperoxide, in a tubular reactor under manometric pressures ranging from 15,000 lbs. per square inch (1055 kg./cm.$^2$) to about 30,000 lbs./sq. inch (2109 kg./cm.$^2$), and at temperatures ranging from 300 to about 480° F. The copolymer thus obtained is separated from the unchanged residual monomer by eliminating, by instantaneous distillation, the unreacted monomers. By varying the conditions of pressure, temperature, concentration of catalyst and the proportion of vinyl acetate in the monomer mixture, one can obtain copolymers of varying molar proportions of ethylene/vinyl acetate and differing inherent viscosities. Other methods of making the copolymers are known, and may be employed. (Also see British Patent 835,466 published May 18, 1960.)

The copolymers thus prepared are tough, rubbery, amorphous products having a high molecular weight of the order of 200,000 to about 500,000 and an inherent viscosity, measured at 86° F. in a 0.25% solution of the copolymer in toluene, of 0.45 to 1.5. These copolymers are organophilic, readily miscible with wax, and provide excellent reinforcement for wax coatings. However, as hot-melt adhesive compositions these copolymers are characterized by at least two critical disadvantages. In the first place, they are characterized by a cohesiveness so great as to preclude their use in hot-melt adhesive equipment conventional to the hot-melt adhesives industry. Secondly, they have no substantial adhesive characteristics.

I have now found that by modifying the copolymer of ethylene/vinyl acetate with the "resinous materials" noted above, it is possible to obtain hot-melt adhesive compositions possessing superior and unexpected properties and suitable for a wide variety of industrial applications.

In general terms, the preparation of the hot-melt adhesive compositions of my invention may be described as follows:

(1) The "resinous material," or mixtures thereof, is placed in a jacketed mixing-pot (or a jacketed heavy-duty mixer of the Baker-Perkins type for compositions having high viscosities) equipped with a stirrer, and the temperature raised to about 300° F. Stainless steel equipment is preferred although other suitable, available equipment may be used.

(2) When the resin has melted, stirring is started and the copolymer of ethylene/vinyl acetate is added slowly to prevent lumping.

(3) Stirring and heating are continued until a clear, transparent, homogeneous mass is obtained. The hot-melt adhesive composition, comprising the modified copolymer of ethylene/vinyl acetate, may be used directly, or it may be molten-extruded into rope form, converted to pellets, or placed in cooling pans and held for later use.

The temperature at which the copolymer of ethylene/vinyl acetate is modified may vary from about 250° F. to about 350° F. depending upon the melting temperature of the particular "resinous material." A temperature of 300–350° F. is preferred.

Although copolymers of ethylene/vinyl acetate may range from about 4–16 mols ethylene/mol vinyl acetate and having inherent viscosities of about 0.6–1.5, I prefer amorphous copolymers containing 4–6 mols ethylene/mol vinyl acetate having an inherent viscosity of about 0.6–1.2, and a molecular weight of about 200,000 to 500,000.

I can add varying amounts of the modifying "resinous material" to the ethylene/vinyl acetate copolymer. For example it is within the scope of my invention to add as much as 400 parts (by weight) of the modifying "resinous material" to 100 parts (by weight) of the copolymer. On the other hand, as little as 25 parts (by weight) of the modifying "resinous material" may be added to 100 parts of the copolymer. The amount of the modifier to be used will be determined largely by the particular industrial use intended for the hot-melt adhesive composition, as will be noted below.

It is also within the scope of my invention to replace a portion of the copolymer of ethylene/vinyl acetate with a diluent comprising a wax or wax-like product, thereby further reducing the melt-viscosity or cohesive characteristics of the composition without appreciably affecting its adhesive characteristics.

Waxes or wax-like products which may be employed to reduce the melt-viscosity or cohesive characteristics of the hot-melt adhesive composition without appreciably decreasing its adhesive characteristics include low molecular weight polymers of ethylene (1500–2500), oxidized low-molecular weight (1500–2500) polymer of ethylene, hydrogenated animal oils, such as hydrogenated tallow or lard; hydrogenated vegetable oils, such as hydrogenated soya oil, cotton seed oil, castor oil and the like; hydrogenated fish oils such as menhaden oil, cod liver oil and the like; paraffin wax; microcrystalline wax; and synthetic waxes made by polymerizing carbon monoxide and hydrogen such as Fischer-Tropsch wax.

It is an advantage of my new hot-melt adhesive compositions that they are simply and easily prepared; they have excellent adhesive properties for direct sealing (or direct bonding) while still retaining much of their original cohesive, or rubbery, properties; they are useful for a wide variety of direct-adhesive industrial applications, they show no viscosity build-up or separation of components while kept in the molten state as contrasted with many hot-melt adhesive compositions of the prior art; furthermore, they may be applied in all types of conventional hot-melt equipment.

It is a special advantage of my new hot-melt-adhesive compositions that they have superior and unexpected properties and are suitable for a wide-range of industrial applications. Compositions containing about 20–30% ethylene/vinyl acetate copolymer modified with about 80–70% of the "resinous material" are characterized by many valuable properties. They have a relatively low viscosity at temperatures of 250–350° F., and can be handled in conventional equipment using a roller applicator; they are soft and flexible while maintaining resistance to flow; they adhere to a wide variety of solid substrates; they are 100% solid and contain no volatile vehicle which has to be removed during application; they are useful for adhering a variety of similar and dissimilar solid substrates.

Compositions comprising about 45% ethylene/vinyl acetate copolymer modified with 55% of the "resinous material" are characterized by fast bonding time (setting speed); adhesion to a wide variety of surfaces; great toughness; resistance to deformation at elevated temperatures (up to 130° F.); good flexibility at low temperatures (as low as 20° F.); can be handled in various physical forms including pellets, granules, or diced, for use in the "extruder"; in rope or cord form for use in the appropriate applicator; or in lumps for use in conventional equipment; and are especially valuable as hot-melt adhesive compositions for the perfect binding of books and making wax-glassine bags where a "paper-tearing" bond is achieved without the use of solvents and at greatly increased production rates.

Compositions comprising about 80% of the ethylene/vinyl acetate copolymer and modified with 20% "resinous material" are characterized by great toughness; fastest bonding time of any of the compositions listed above with excellent adhesiveness to a wide variety of similar and dissimilar surfaces; greater resistance to deformation up to temperatures of about 200° F. while maintaining excellent low-temperature flexibility; they can be handled conveniently in various forms such as pellets, diced, or granules for use in an extruder or in rope form in the appropriate applicator; they are useful as hot-melt adhesive compositions for adhering metals to polyethylene and polyester films where heat resistance, or extremely fast bonding time is required, such as in sealing packages containing hot foods and the like.

The following examples will further illustrate the embodiment of my invention. All parts are by weight, unless otherwise indicated. In these examples when reference is made to the "resinous material," the latter refers specifically to the non-thermosetting phenolic modified terpene resin resulting from the acid catalyzed condensation between essentially equimolar proportions of alpha-pinene and phenol. Moreover, the inherent viscosities of the various ethylene/vinyl acetate copolymers described in these examples were determined in toluene at 86° F.

EXAMPLE I

In the following example, a non-thermosetting phenolic resin is used as the modifying resinous material. The formulation follows:

| | Parts |
|---|---|
| Copolymer of ethylene/vinyl acetate | 50 |
| Resinous material | 50 |

The resinous material is placed in an oil-jacketed, stainless steel mixing pot equipped with a stainless-steel stirrer. The pot is first heated to about 300° F., the resinous material added and melted. Stirring is then started and the copolymer added slowly to prevent lumping. (The copolymer is an amorphous, rubbery material containing about 5.4 mols ethylene per mol vinyl acetate, having an inherent viscosity of about 0.98 and a molecular weight of about 400,000 to 500,000.) Stirring and heating are continued until a clear, homogeneous, transparent mass is obtained. The modified-copolymer composition is fluid at about 300° F. to 375° F., is fast setting, forms a tough, rubbery film possessing excellent adhesiveness. In the molten state it could be coated on papers, glass, metals, foils, fabrics, wood, and plastic films, including polyethylene and polyester films, to obtain coatings having exceptionally high adhesion to the surfaces to which they are applied. If desired, the coated surfaces could be immediately bonded to other similar or dissimilar surfaces.

When the above example is repeated omitting the resinous material, the resulting unmodified copolymer has no adhesive properties when applied to glass, papers, metals, foils, fabrics, films, wood, etc., and at 350° F. it is so cohesive that its viscosity could not be determined by a Brookfield viscometer.

EXAMPLE II

In the following example, a tough, rubbery, hot-melt adhesive composition is prepared which is useful for bonding metal (e.g., aluminum foil) to paper, films, and the like. The ethylene/vinyl acetate copolymer has about five mols ethylene/mol vinyl acetate, an inherent viscosity of about 0.7 and a molecular weight of about 300,000. The formulation follows:

| | Parts |
|---|---|
| Copolymer of ethylene/vinyl acetate | 80 |
| Resinous material | 20 |

In this modification, a jacketed, dough mixer having sigma blades is heated to about 325° F., after which the resinous material is added. The ethylene/vinyl acetate copolymer is then added, and stirring and mixing continued until the mass is homogeneous. For convenience in handling, the cooled, modified product may be granulated and then converted in a molten extruder to a rope form and applied as an adhesive in a rope applicator at a temperature of about 300–350° F. to bond metal (e.g. aluminum foil) to other surfaces as in foil-bag manufacture or in thermal insulation in building construction. The modified product may also be diced for application in an extruder. The modified, hot-melt composition is moderately-fast setting. In the molten state, it could be coated on paper, waxed glassine, glass, metals, fabrics, wood, polyethylene films and polyester films to obtain coatings having exceptionally high adhesion to the surfaces to which they were applied. The coated surfaces could also be direct-bonded immediately to other similar and dissimilar surfaces.

EXAMPLE III

In the following Example films of the hot-melt adhesive composition of Example I are evaluated for tensile strength, cold flow at 120° F. and cold crack.

The films are prepared by means of a heated Bird applicator, the hot-melt adhesive composition being cast on a Teflon-coated sheet to give a film thickness of about 20 mils. After cooling, the films are stripped from the plate and tested as follows:

(1) For tensile strength, Test Method A of the American Society for Testing Materials (ASTM) D882–56T is followed using an Instron Tensile Tester.

(2) For cold flow: Cold flow as contemplated in this invention relates to the softness property of the hot-melt adhesive which permits the film to elongate or stretch when a load is applied at a given temperature. As the temperature os increased, the cold flow increases under the same load. This measurement is made to determine the property of hot-melt adhesive compositions useful for perfect binding books. A hot-melt adhesive composition with high cold-flow will permit a perfect-bound book to be easily distorted and the book will "flow apart" under stress, as when the book is folded back-to-back by the reader for ease in reading. The test is made on a strip (of the above adhesive film) measuring ½ x 2 inches. The film is held between clamps leaving a center area one inch long exposed. A 3-oz. weight is attached to one of the clamps and the specimen attached to a support by means of the other clamp. Tests are generally made at 72° F. The amount of elongation after five minutes is termed "cold-flow."

(3) Cold-crack temperature. Cold-crack temperature as contemplated in this invention relates to the hardness or brittleness property of the hot-melt adhesive film which causes the film to fracture when the film is bent. The test is made on strips of the adhesive film measuring ¼ x 2 inches. One of the strips is immersed in water having a certain low temperature for a period of three minutes. Only one film is tested at a time. The film is then held by forceps gripped at the two ends and bent to 360°. If the film does not crack at the particular temperature at which the test is made, the temperature of the bath is lowered and the test is repeated. The temperature at which the film cracks is defined as the "cold-crack temperature." It is obvious that the lower the cold-crack temperature, the lower the temperature at which the book may be handled without "falling apart." This is especially valuable for the military who are required to use their manuals in cold climates, or in more moderate climates during the winter months. The results of these tests follow:

| | Film from Example I | Present commercial films |
|---|---|---|
| Tensile strength | 980 p.s.i. | 300–500 p.s.i. |
| Cold flow (72° F.) | 0% | 200–300%. |
| Cold flow (120° F.) | 0% | "Flow apart." |
| Cold crack | Less than 19° F. | 35–51° F. |

It will be observed that at 72° F. present commercial films comprising other copolymers of vinyl acetate have an elongation of up to 300%, whereas the films of Example I showed 0% elongation at this temperature. In order to check the temperature at which the films of Example I might show cold flow, the tests were repeated at temperatures up to 120% F., and no measurable cold flow was noted (results in above table).

Variations in materials, proportions, and procedures will be apparent to the practitioner, without departing from the scope of this invention, which is limited only by the following claims.

I claim:

1. A hot-melt adhesive composition capable of bonding similar and dissimilar substrates, said composition comprising 100 parts by weight of copolymer of ethylene and vinyl acetate and from 25 to 400 parts, by weight of the copolymer, of a non-thermosetting, phenolic modified terpene resin consisting of the product resulting from the acid catalyzed condensation between essentially equimolar proportions of alpha-pinene and phenol.

2. The composition of claim 1, wherein the copolymer of ethylene and vinyl acetate has an inherent viscosity of about 0.6 to 1.5, as determined in toulene at 86° F., and consists of about 4 to 16 moles of ethylene per mole of vinyl acetate.

References Cited

UNITED STATES PATENTS

| 1,469,709 | 10/1923 | Wuyts | 260—62 |
| 2,471,453 | 5/1949 | Rummelsburg | 260—62 |
| 2,492,760 | 12/1949 | Murphy et al. | 260—27 |
| 2,741,651 | 4/1956 | Been et al. | 260—19 |
| 3,025,167 | 3/1962 | Butler | 99—171 |
| 3,058,930 | 10/1962 | Samour | 260—4 |
| 3,220,966 | 11/1965 | Flanagan | 260—27 |
| 3,232,895 | 2/1966 | Klein et al. | 260—27 |
| 3,282,881 | 11/1966 | Flanagan | 260—33.8 |

SAMUEL H. BLECH, *Primary Examiner.*

C. J. SECCURO, *Assistant Examiner.*

U.S. Cl. X.R.

117—124, 132, 138.8, 148, 155; 161—218; 260—23, 28.5, 62, 87.3; 281—15